(12) United States Patent  
Yang

(10) Patent No.: US 8,538,641 B2  
(45) Date of Patent: Sep. 17, 2013

(54) MULTI-MOTOR DRIVE SYSTEM WITH DIFFERENTIAL SPEED REGULATED BY CVT

(76) Inventor: Tai-Her Yang, Dzan-Hwa (TW)

(*) Notice: Subject to any disclaimer, the term of this patent is extended or adjusted under 35 U.S.C. 154(b) by 732 days.

(21) Appl. No.: 12/654,643

(22) Filed: Dec. 28, 2009

(65) Prior Publication Data

US 2011/0160944 A1 Jun. 30, 2011

(51) Int. Cl.  
*B60W 10/04* (2006.01)

(52) U.S. Cl.  
USPC .................................. 701/51; 701/22; 477/3

(58) Field of Classification Search  
USPC .................. 701/22, 51; 180/65.1, 65.6, 65.7, 180/65.25, 65.26; 477/3, 5  
See application file for complete search history.

(56) References Cited

U.S. PATENT DOCUMENTS

| | | | |
|---|---|---|---|
| 6,971,968 B2* | 12/2005 | Imazu et al. | 477/2 |
| 7,108,087 B2* | 9/2006 | Imai | 180/65.23 |
| 2004/0245029 A1* | 12/2004 | Irikura | 180/6.24 |
| 2008/0108476 A1* | 5/2008 | Pagot et al. | 477/5 |
| 2010/0084207 A1* | 4/2010 | Wyall | 180/65.22 |

* cited by examiner

*Primary Examiner* — Darnell Jayne  
*Assistant Examiner* — Sasha T Varghese  
(74) *Attorney, Agent, or Firm* — Bacon & Thomas, PLLC

(57) ABSTRACT

In a system in which two or motors drive a common load, respective continuously variable transmissions are installed between each individual motor and a respective individual load in the form of a wheel group, the respective continuously variable transmissions providing a differential speed drive operation.

24 Claims, 4 Drawing Sheets

MULTI-MOTOR DRIVE SYSTEM WITH DIFFERENTIAL SPEED REGULATED BY CVT

BACKGROUND OF THE INVENTION (a) Field of the Invention

The present invention relates to two or more independent motors for driving a common load through individual loads, with speed ratio variation between the individual loads being enabled by continuously variable transmissions (CVTs) individually installed between the individual motors and the individual loads, thereby providing a differential speed operation drive between the loads driven by individual motors.

(b) Description of the Prior Art

Traditionally, when two or more individual loads installed on a common load are driven through differential speed regulation by a single motor, the differential speed function is often achieved by a differential wheel group. This type of differential speed regulation has shortcomings including transmission efficiency loss, space used, and weight. If a vehicle is driven by two motors, two independent drive circuits are often installed, and a central control unit refers to parameters such as vehicle speed, output rotational speed, steering wheel shift values, as well as road gradient, center of gravity in the vehicle after loading, and processes for controlling the two independent drive circuits, and then the two independent drive circuits respectively drive the two motors in response to a closed loop or semi-closed loop rotational speed control between the two motors for achieving the differential speed function. This type of feedback control also has shortcomings including high cost and complex system operation.

SUMMARY OF THE INVENTION

The present invention relates to a system for driving a common load using two or more motors, in which a respective CVT is installed between each individual motor and an individual load that includes a wheel group, thereby providing differential speed drive operation through the speed ratio variations of the respective CVTs.

DESCRIPTION OF MAIN COMPONENT SYMBOLS

CCU100, CCU200, CCU300, CCU400: Central control unit
CL100, CL200, CL300, CL400: Controllable clutch unit
CVT100, CVT200, CVT300, CVT400: Continuous variable transmission
ECU100, ECU200, ECU300, ECU400: Electric control unit
EMU 100: Electric energy management unit
ESD 100: Electric storage-discharge unit
FC100: Fuel control unit
G100: Generator
ICE 100: Engine
L100, L200, L300, L400: Common load body
M100, M200, M300, M400: Motor
MI100, MI200, MI300, MI400: User interface
SD 100: Engine speed detecting device
T100, T200, T300, T301, T400: Transmission
TANK100: Tank
W100, W200, W300, W301, W400, W401: Wheel group

DETAILED DESCRIPTION OF THE PREFERRED EMBODIMENTS

The present invention relates to a multiple motor driving system for a common load, including two or more motors and respective CVTs installed between the individual motors and individual loads, the individual loads including a wheel group, such that the two or more motors installed on the common load structure individually drive the individual loads through the respective CVTs to provide differential speed drive operation through the speed ratio variation by the CVTs.

Each CVT in the present invention is a continuously variable transmission that can automatically change the speed ratio according to the load state, or change the speed ratio in response to external manipulation. The CVT may include any of a variety of types, such as rubber belt type, metal belt type, and chain type CVT, an electronic continuously variable transmission (ECVT), a friction disk type, or a conventional iso-axis continuously variable transmission.

The common load in the present invention refers to a wheel-type vehicle, a tracked vehicle, a rail vehicle, a ship driven by at least two independent motors, a conveyor for a stream of people or logistics, or industrial equipment driven by at least two motors. The common load may be further equipped with an engine power system, free wheel, and related user interface unit.

Figure 1:
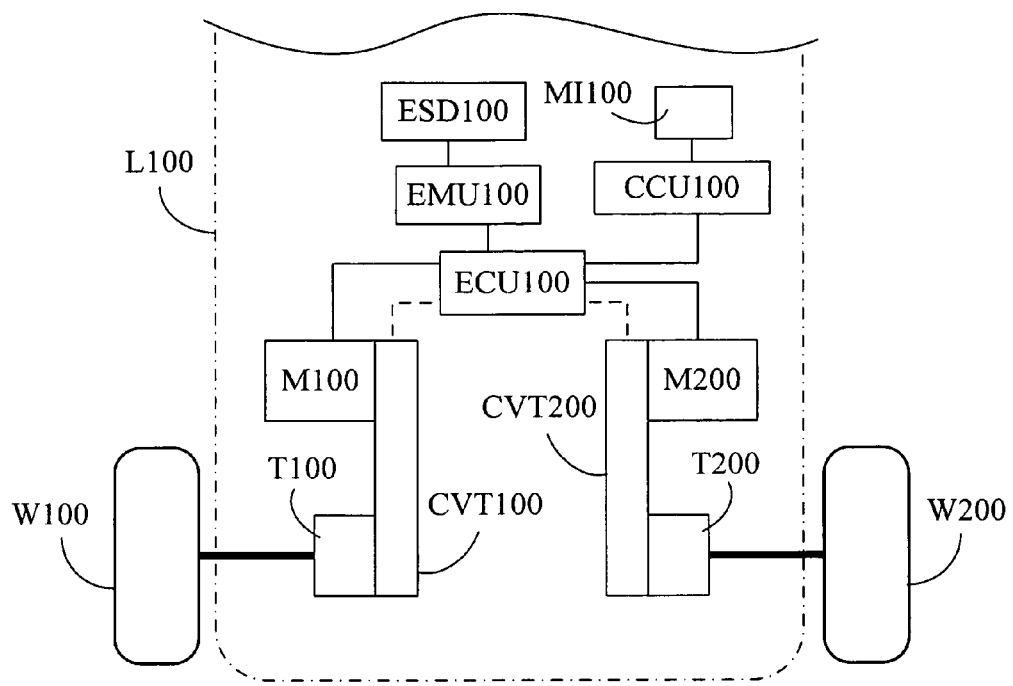
FIG. 1 is a schematic view showing an embodiment of a multi-motor drive system with differential speed regulated by continuous variable transmissions.

The various embodiments of the present invention are as follows:

FIG. 1 is a schematic view showing an embodiment of a multiple motor drive system with differential speed regulated by respective continuously variable transmissions (CVTs).

As shown in FIG. 1, for common load body L100, motor M100 is installed to drive wheel group W100 as an individual load through continuously variable transmission CVT100 and transmission T100, and motor M200 is installed to drive wheel group W200 as an individual load through continuously variable transmission CVT200 and transmission T200. If the wheel group W100 and the wheel group W200 placed on the common load body L100 are driven with differential speed, the continuously variable transmission CVT100 and the continuously variable transmission CVT200 automatically regulate the speed ratio with the load variation, to coordinate the differential speed between the wheel group W100 and the wheel group W200. The system of this embodiment may include the following components:

motors M100, M200: constituted by rotary motors, which are AC or DC, brushless or brush, synchronous or non-synchronous, internal or external rotation type;

continuously variable transmissions CVT100, CVT200: constituted by continuously variable transmissions that can automatically change the speed ratio with the load state, or change the speed ratio in response to external manipulation, and which may include any of a variety of types, such as a rubber belt type, metal belt type, and chain type CVT, electronic continuously variable transmission (ECVT), friction disk type, or conventional iso-axis continuously variable transmission;

transmission T100: constituted by a fixed speed ratio, variable speed ratio, or stepless variable speed transmission that includes a mechanical gear unit, sprocket unit, pulley unit, or linkage group as needed;

electric control unit ECU100: constituted by an electrical machine and/or solid state power element, an electronic element, a microprocessor, and/or related software, for accepting control by a user interface MI100 and/or central control unit CCU100, wherein a motor drive control circuit is installed within the electric control unit ECU100 for manipulating rotational speed, torque, rotary direction, and current of the parallel motors M100 and M200; or motor drive control circuits are individually arranged for the motors M100 and M200 and individually installed within the electric control unit ECU100, for individually manipulating rotational speed, torque, rotary direction, and current of the motors M100 and M200, wherein the motor control circuit or individual motor control drive circuits do not require a closed loop or semi-closed loop rotational speed control between the two motors to achieve the differential speed function, the differential speed operation between the individual loads instead being regulated by the continuously variable transmissions installed between the individual motors and loads; if the system of this embodiment utilizes continuously variable transmissions that accept external manipulation for changing the speed ratio, then electric control unit ECU100 may include drive control circuits for a user interface MI100 and/or the continuously variable transmissions are controlled by a central control unit CCU100;

electric energy management unit EMU100: constituted by electric machine and/or solid state power element, an electronic element, a microprocessor, and/or related software, for controlling output voltage and current, charging voltage and current of an electric storage-discharge unit ESD100, and charging start and stop;

central control unit CCU100: constituted by an analog or digital control device, or a mixed analog and digital control device, and including an electric machine and/or solid state power element, a microprocessor, control software, and/or related circuit elements, for following commands of the user interface MI100, and/or for setting control modes and further controlling the operation of the system;

user interface MI100: constituted by a linear analog or digital control device, or a mixed analog and digital control device, and including an operating mechanism, electric machine, and/or solid state circuit for linking with the central control unit CCU100, to control the operation of the system; and electric storage-discharge unit ESD100: constituted by at least one rechargeable secondary battery, capacitor, or super capacitor.

Through the operation of the above device, when the common load body L100 is driven for operation, and wheel group W100 and wheel group W200 undergo differential speed operation, continuously variable transmission CVT100 and continuously variable transmission CVT200 individually regulate the speed ratio according to the load variation on the wheel group W100 and the wheel group W200, to facilitate the differential speed operation drive between the wheel group W100 and the second wheel group W200 installed on the common load body L100.

Figure 2:
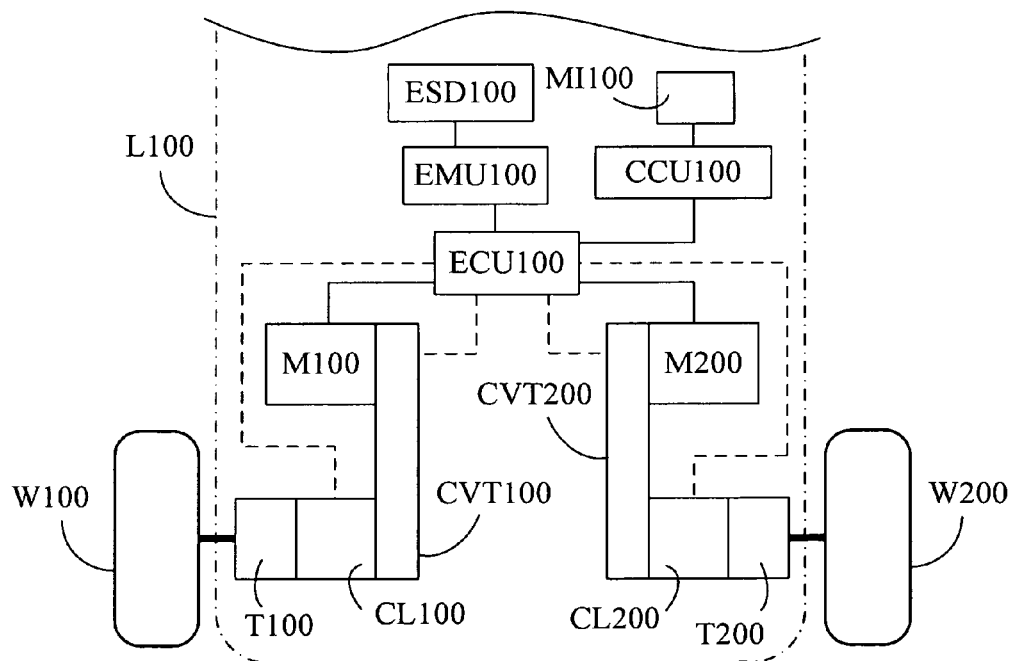
FIG. 2 is a schematic view showing the embodiment of FIG. 1 additionally installed with a controllable clutch unit.

In addition, instead of directly driving the load through CVTs, or through CVTs and transmissions, a controllable clutch unit CL100 may be additionally installed between continuously variable transmission CVT100 and transmission T100, and a controllable clutch unit CL200 may be additionally installed between continuously variable transmission CVT200 and transmission T200. FIG. 2 is a schematic view showing an embodiment of a multiple motor drive system with differential speed regulated by continuous variable transmissions as in FIG. 1, but which is additionally installed with controllable clutch units.

The controllable clutch units CL100 and CL200 installed between the continuously variable transmission CVT100 and the transmission T100, and between the continuously variable transmission CVT200 and the transmission T200, are used to individually control coupling and cut-off between the continuous variable transmission CVT100 and the transmission T100, and between the continuous variable transmission CVT200 and the transmission T200. The system of this embodiment may, as shown in FIG. 2, include the following components:

controllable clutch units CL100, CL200: each constituted by a clutch device or structure with the function of linking transmission or cutting separation, which may be driven by manpower, electricity, magnetic power, machine power, gas pressure, liquid pressure, and/or centrifugal force, and which has a rotary input side and a rotary output side.

Two or more sets of the multiple motor drive system with differential speed regulated by CVTs may further be installed in a four- or more-wheel drive system.

Figure 3:
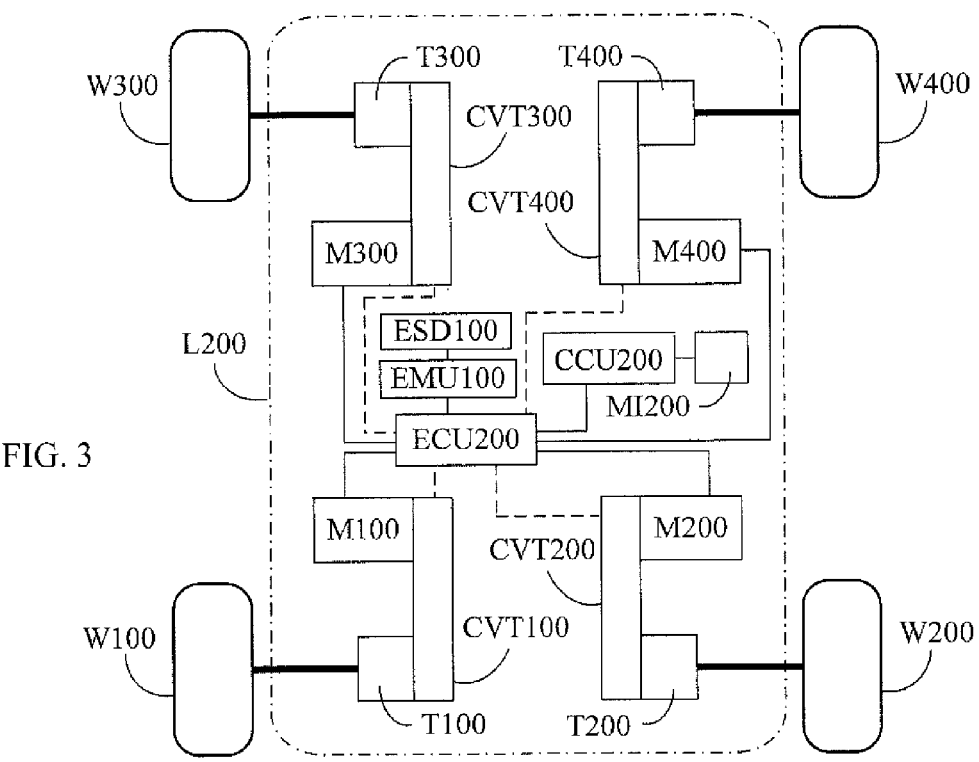
FIG. 3 is a schematic view showing two sets of multi-motor drive systems with differential speed regulated by continuous variable transmissions shown in FIG. 1, installed in a four-wheel drive common load body L200.

FIG. 3 is a schematic view showing an embodiment with two sets of the multiple motor drive systems with differential speed regulated by continuous variable transmissions of the type shown in FIG. 1, but installed in a four-wheel drive common load body L200. As shown in FIG. 3, the main components include:

common load body L200: in which two sets of the multiple motor drive systems with differential speed regulated by CVTs are installed, and in which the first set of the multiple motor drive systems with differential speed regulated by CVTs is installed at the front end of the common load body L200, and the second set of the multiple motor drive systems with differential speed regulated by CVTs is installed at the back end of the common load body L200, wherein the first set of the multi-motor drive systems with differential speed regulated by CVTs includes:

motors M100, M200: constituted by rotary motors, which are AC or DC, brushless or brush, synchronous or non-synchronous, internal or external rotation type;

continuous variable transmissions CVT100, CVT200: constituted by continuously variable transmissions that can automatically change the speed ratio with the load state, or change the speed ratio by accepting external manipulation, and which may include any of a variety of types, such as a rubber belt type, metal belt type, and chain type CVT, electronic continuously variable transmission (ECVT), friction disk type, or conventional iso-axis continuously variable transmission; and transmissions T100, T200: in the form of fixed speed ratio, variable speed ratio, or stepless variable speed transmissions, which are constituted by mechanical gear units, sprocket units, pulley units, or linkage groups; and are selectable as needed;

the second set of the multi-motor drive system with differential speed regulated by CVT includes:

motors M300, M400: constituted by rotary motors, which are AC or DC, brushless or brush, synchronous or non-synchronous, internal or external rotation type;

continuously variable transmissions CVT300, CVT400: constituted by continuously variable transmissions that can automatically change the speed ratio with the load state, or change the speed ratio by accepting external manipulation, and that may include any of a variety of types, such as a rubber belt type, metal belt type, or chain type CVT, an electronic continuously variable transmission (ECVT), a friction disk type, or a conventional iso-axis continuously variable transmission; and transmissions T300, T400: in the form of fixed speed ratio, variable speed ratio, or stepless variable speed transmissions, which are constituted by mechanical gear units, sprocket units, pulley units, or linkage groups, the main components of this embodiment further including:

electric control unit ECU200: constituted by an electric machine and/or solid state power element, an electronic element, a microprocessor, and/or related software, for accepting the control of a user interface MI200 and/or central control unit CCU200, wherein a motor drive control circuit is installed within the electric control unit ECU200 for manipulating rotational speed, torque, rotary direction, and current of the parallel motors M100 and M200, and M300 and M400; or two motor drive control circuits are installed within the electric control unit ECU200, in which one motor drive control circuit is used to control the parallel motors M100 and M200, including controlling the rotational speed, torque, rotary direction, and current of the motors M100 and M200, and another motor drive control circuit is used to control the parallel motors M300 and M400, including controlling the rotational speed, torque, rotary direction, and current of the motors M300 and M400; or motor drive control circuits are individually arranged for motors M100, M200, M300, and M400 individually installed within the electric control unit ECU200, for individually manipulating rotational speed, torque, rotary direction, and current of the motors M100, M200, M300, and M400; wherein the drive control circuits do not require a closed loop or semi-closed loop rotational speed control between the two motors to achieve the differential speed function; the differential speed operation between the loads with differential speed instead being regulated by the continuously variable transmissions installed between the individual motors and loads; and wherein if a system includes continuously variable transmissions that accept external manipulation for changing speed ratios, electric control unit ECU200 includes a user interface MI200 that accepts manual manipulation and/or continuously variable transmissions that are controlled by a central control unit CCU200;

electric control unit ECU100: constituted by an electric machine and/or solid state power element, an electronic element, a microprocessor, and/or related software, for controlling output voltage and current, charging voltage and current of an electric storage-discharge unit ESD100, and charging start and stop;

central control unit CCU200: constituted by analog or digital control device, or mixed analog and digital control devices, constituted by an electric machine and/or solid state power element, a microprocessor, control software, and/or related circuit elements, for following commands of the user interface MI200, and/or for setting control modes and further controlling the operation of the system;

user interface MI200: in the form of a linear analog or digital control device, or mixed analog and digital control devices, and constituted by an operating mechanism, electric machine, and/or solid state circuit, for linking with the central control unit CCU200, to control the operations of the first set of the multiple motor drive systems with differential speed regulated by CVTs, and the second set of the multiple motor drive systems with differential speed regulated by CVTs in turn; and electric storage-discharge unit ESD100: constituted by at least one rechargeable secondary battery, capacitor, or super capacitor.

The system, as shown in FIG. 3, carries out one or more of the following operational functions:

1. for the first set of the multiple motor drive systems with differential speed regulated by CVTs installed at the front end of the common load body L200, the continuous variable transmission CVT100 and the continuous variable transmission CVT200 individually regulate the speed ratio with the load variation, to coordinate the differential speed between the wheel group W100 and the second wheel group W200;

2. for the second set of the multiple motor drive systems with differential speed regulated by CVTs installed at the back end of the common load body L200, the continuous variable transmission CVT300 and the continuous variable transmission CVT400 individually regulate the speed ratio with the load variation, to coordinate the differential speed between the wheel group W300 and the second wheel group W400; and 3. for the first and second sets of the multiple motor drive systems with differential speed regulated by CVTs respectively installed at the front and back ends of the common load body L200, the continuously variable transmissions CVT100, CVT200, CVT300, and CVT400 individually regulate the speed ratio with the load variation, to coordinate with differential speeds among the wheel groups W100, W200, W300, and W400.

Figure 4:
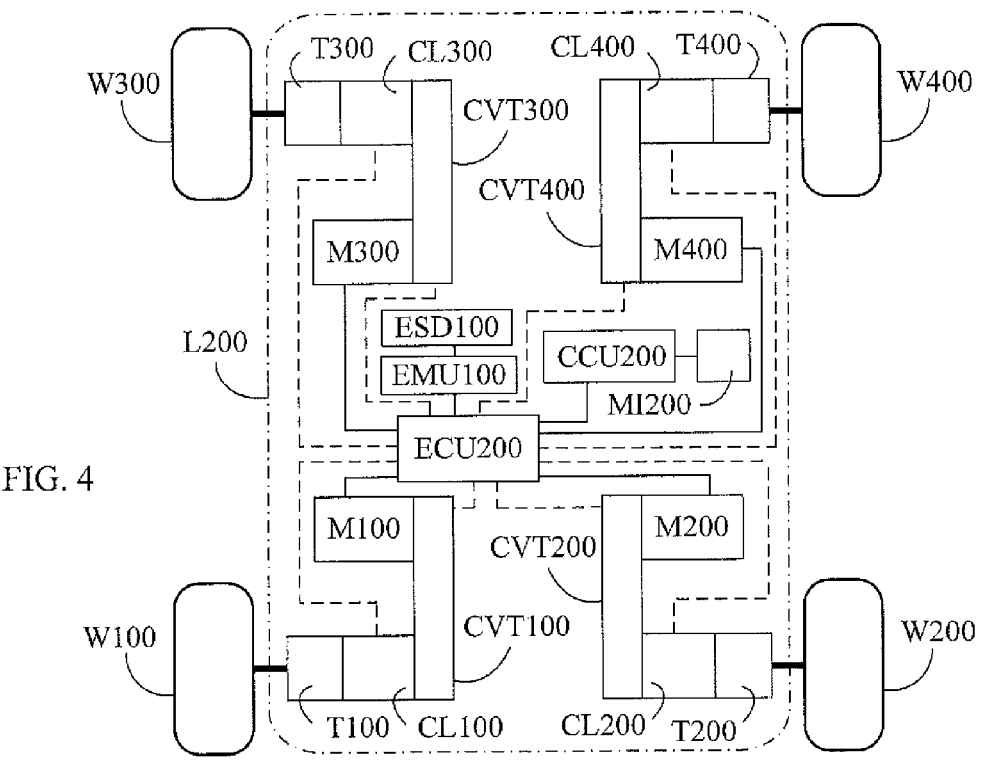
FIG. 4 is a schematic view showing an embodiment of the system of FIG. 3 additionally installed with a controllable clutch unit.

In addition, as shown in FIG. 3, instead of directly driving the load through CVTs, or driving the load through CVTs and transmissions, a controllable clutch unit CL100 may be additionally installed between the continuously variable transmission CVT100 and the transmission T100, and a controllable clutch unit CL200 may be additionally installed between the continuously variable transmission CVT200 and the transmission T200, and for the second set of the multiple motor drive system with differential speed regulated by CVTs, a controllable clutch unit CL300 may be additionally installed between the continuously variable transmission CVT300 and the transmission T300, and a controllable clutch unit CL400 may be additionally installed between the continuously variable transmission CVT400 and the transmission T400. FIG. 4 is a schematic view showing the embodiment of the system of FIG. 3 additionally installed with controllable clutch units.

The controllable clutch units CL100 and CL200 installed between the continuous variable transmission CVT100 and the transmission T100, and between the continuous variable transmission CVT200 and the transmission T200, are used to individually control coupling and cut-off between the continuously variable transmission CVT100 and the transmission T100, and between the continuously variable transmission CVT200 and the transmission T200.

The controllable clutch units CL300 and CL400 installed between the continuously variable transmission CVT300 and the transmission T300, and between the continuously variable transmission CVT400 and the transmission T400, are used to individually control coupling and cut-off between the continuously variable transmission CVT300 and the transmission T300, and between the continuously variable transmission CVT400 and the transmission T400, as shown in FIG. 4, wherein controllable clutch units CL100, CL200, CL300, CL400 are each constituted by a clutch device or structure with the function of linking transmission or cutting separation, and which are driven by manpower, electricity, magnetic power, machine power, gas pressure, liquid pressure, and/or centrifugal force, and which have a rotary input side and rotary output side.

The multi-motor drive system with differential speed regulated by CVTs may further be applied to a hybrid power drive system.

Figure 5:
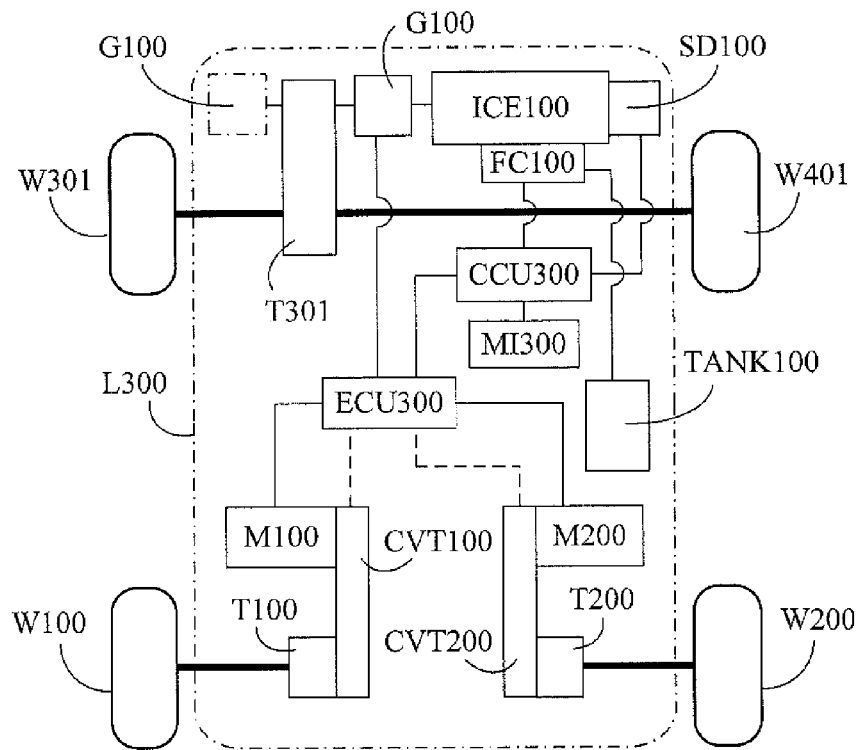
FIG. 5 is a schematic view showing an embodiment in which multi-motor drive systems with differential speed regulated by continuous variable transmissions and an engine power drive unit are simultaneously installed at a common load body L300 to form a hybrid power system.

FIG. 5 is a schematic view showing an embodiment in which multiple motor drive systems with differential speed regulated by continuously variable transmissions and an engine power drive unit are simultaneously installed in a common load body L300 to form a hybrid power system.

As shown in FIG. 5, the main components include:
common load body L300: one end of which is installed with a multiple motor drive system with differential speed regulated by the continuous variable transmission CVT100 and the continuous variable transmission CVT200; and another end of which is installed with an engine power system constituted by an engine ICE100 and a transmission T301 with the functions of clutch, speed change, and differential speed, for driving wheel group W301 and wheel group W401;
motors M100, M200: constituted by rotary motors, which are AC or DC, brushless or brush, synchronous or non-synchronous, internal or external rotation type;
generator G100: constituted by an AC or DC, brushless or brush, synchronous or non-synchronous, internal or external rotation type generator; and which is installed between the engine ICE100 and the transmission T301, at the non-engine coupling side of the transmission T301, or at the unit driven by the transmission T301;
continuously variable transmissions CVT100, CVT200: in the form of continuously variable transmissions that can automatically change the speed ratio with the load state, or change the speed ratio by accepting external manipulation, and which may include any of a variety of types of continuously variable transmission, such as a rubber belt type, metal belt type, and chain type CVT, an electronic continuously variable transmission (ECVT), a friction disk type, or a conventional iso-axis continuously variable transmission; and
electric control unit ECU300: constituted by an electric machine and/or solid state power element, an electronic element, a microprocessor, and/or related software, for accepting the control of user interface MI300 and/or central control unit CCU300, to control the power generation operation timing of the generator G100 and the voltage and current of the generating power, in which one motor drive control circuit is installed within the electric control unit ECU300 to control the rotational speed, torque, rotary direction, and current of the parallel motors M100 and M200; or motor drive control circuits individually arranged for the motors M100 and M200 are installed within the electric control unit ECU300 to individually control the rotational speed, torque, rotary direction, and current of the parallel motors M100 and M200, wherein the motor drive control circuits do not carry out closed loop or semi-closed loop rotational speed control between the two motors to achieve the differential speed function but rather regulate the differential speed operation between the loads by means of the continuously variable transmissions installed between the individual motors and loads. If the continuous variable transmissions accept external manipulation for changing speed ratio, the electric control unit ECU300 includes drive control circuits for user interface MI100 and/or the continuously variable transmissions are controlled by central control unit CCU300;
central control unit CCU300: in the form of an analog or digital control device, or a mixed analog and digital control device, and constituted by an electric machine and/or solid state power element, a microprocessor including control software, and/or related circuit elements, for following the commands of the user interface MI300, or for setting control modes, and/or a feedback signal of an engine speed detecting device SD100, and further controlling the operation of the system;
user interface MI300: in the form of a linear analog or digital control device, or a mixed analog and digital control device, and constituted by an operating mechanism, an electric machine, and/or a solid state circuit, for linking with the central control unit CCU300 to control the operation of the multiple motor drive system with differential speed regulated by the continuous variable transmission CVT100 and the continuous variable transmission CVT200, and to control the operation of the engine power system;
transmissions T100, T200: in the form of fixed speed ratio, variable speed ratio, or stepless variable speed transmissions, which are constituted by mechanical gear units, sprocket units, pulley units, or linkage groups; and are selectable as needed; and
transmission T301: constituted by transmission components with the functions of clutch, and/or speed change, and/or differential speed.

When the common load body L300 is driven for operation, and the wheel groups W100 and W200 undergo differential speed operation, the continuously variable transmission CVT100 and the continuous variable transmission CVT200 individually regulate the speed ratio in accordance with the load variation of the wheel group W100 and the wheel group W200, to facilitate the differential speed operation drive between the wheel group W100 and the second wheel group W200.

The system of this embodiment is installed with a required fuel control unit FC100, tank TANK100, and/or engine speed detecting device SD100 for the control of the engine drive operation, including:
fuel control unit FC100: constituted by a power-driven servo unit and/or a mechanical and/or current force-type drive unit for accepting direct control from central control unit CCU300 and/or engine speed detecting device SD100, for controlling the fuel supply status of the engine ICE100, and then for controlling the rotational speed and the torque force of the engine ICE100;

tank TANK100: which is used for engine fuel storage and, through the fuel pipeline and the fuel control unit FC100 between the tank TANK100 and the engine ICE100, for controlling the fuel to the engine ICE100; and engine speed detecting device SD100: constituted by an analog or digital rotational speed detecting device, which converts the amount of angular displacement to a corresponding physical signal and/or substitutes an analog voltage value or frequency value of the generator G100, and transmits an engine rotational speed signal to the central control unit CCU300, and/or which directly controls the fuel to the engine from the fuel control unit FC100, the engine speed detecting device SD100 alternatively being constituted by a mechanical detecting structure, such as a centrifugal type structure, that mechanically interacts with the fuel control unit FC100 to control the operation of the engine ICE100.

The hybrid power system shown in FIG. 5 may have one or more of the following operational functions, including:

the power system may be driven by the engine ICE100 to drive the wheel group W301 and the wheel group W401, for driving the common load body L300; and/or the engine ICE100 may be operated within a range of rotational speeds that provides lower fuel consumption and higher output power, i.e., a more fuel-efficient operation region with best break specific fuel consumption, to drive the generator G100 and generate power for controlling the operation of motors M100 and motor M200 directly, or through the motor drive control circuit installed within the electric control unit ECU300, for driving the common load body L300.

Figure 6:
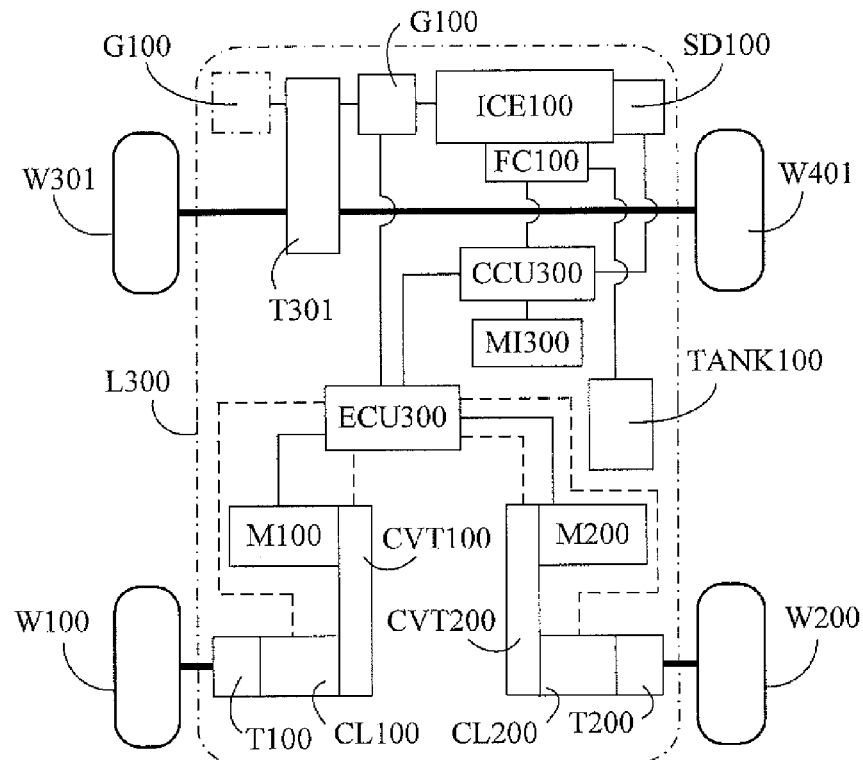
FIG. 6 is a schematic view showing an embodiment of the system of FIG. 5 additionally installed with a controllable clutch unit.

As shown in FIG. 5, the multiple motor drive system with differential speed regulated by continuously variable transmissions and the engine power drive unit are installed in the common load body L300 to constitute a hybrid power system, with individual loads being directly driven by the continuously variable transmissions, or driven by the continuous variable transmissions CVT and additional transmissions, or a controllable clutch unit CL100 is additionally installed between the continuously variable transmission CVT100 and the transmission T100, and a controllable clutch unit CL200 is additionally installed between the continuously variable transmission CVT200 and the transmission T200, to individually control linking transmission or cutting separation between the continuously variable transmission CVT100 and the transmission T100, and between the continuously variable transmission CVT200 and the transmission T200. FIG. 6 is a schematic view showing an embodiment of the system of FIG. 5 additionally installed with the controllable clutch units, the controllable clutch units CL100, CL200 shown in FIG. 6 each constituted by a clutch device or structure with the function of linking transmission or cutting separation, which is driven by manpower, electricity, magnetic power, machine power, gas pressure, liquid pressure, and/or centrifugal force, and which has a rotary input side and a rotary output side.

The hybrid power system constituted by the multiple motor drive system with differential speed regulated by CVTs and the engine power system may additionally be installed with an electric storage-discharge unit ESD100 to improve the functionality of the hybrid power system.

Figure 7:
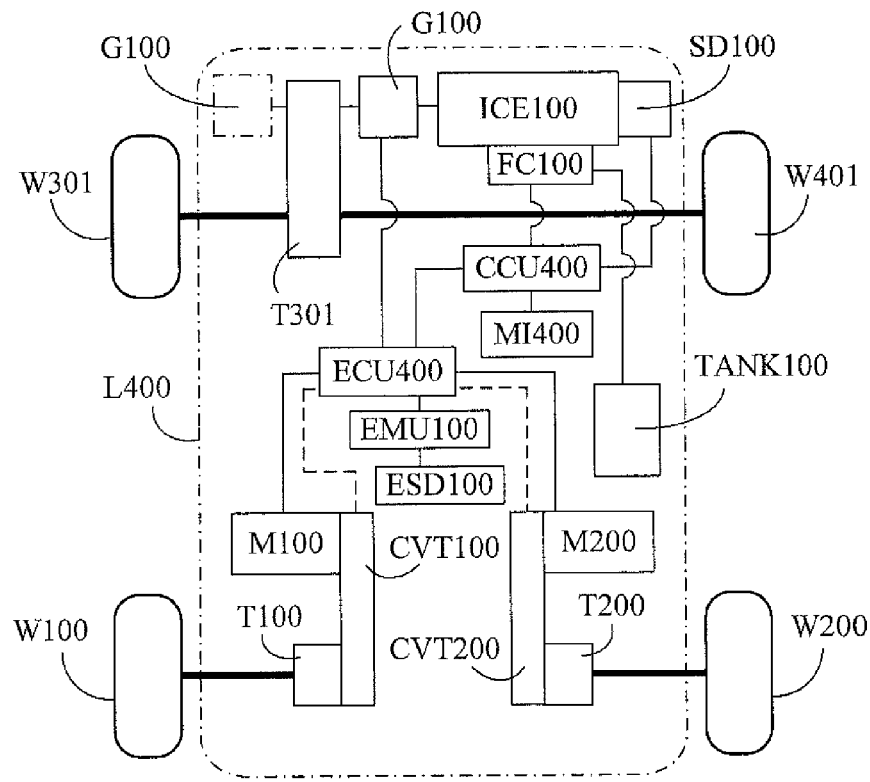
FIG. 7 is a schematic view showing an embodiment in which multi-motor drive systems with differential speed regulated by continuous variable transmissions, an engine power drive unit, and an electric storage-discharge unit ESD100 are simultaneously installed in a common load body L400 to form a hybrid power system.

FIG. 7 is a schematic view showing an embodiment in which multiple motor drive systems with differential speed regulated by continuously variable transmission CVT, an engine power drive unit, and an electric storage-discharge unit ESD100 are simultaneously installed in a common load body L400 to form a hybrid power system.

As shown in FIG. 7, the electric storage-discharge unit ESD100 is used to accept power generated by the generator G100 driven by the engine ICE100 for charging, and/or to accept electricity generated as a result of kinetic energy recovery by the motor M100 and/or the motor M200 for charging, and/or to accept an external power supply for charging, with power from the electric storage-discharge unit ESD100 and/or the power generated by the generator G100 being provide to the motor drive control circuit in the electric control unit ECU400 for controlling the operations of the motor M100 and the motor M200, the main components of the system shown in FIG. 7 including:

common load body L400: one end of which is installed with the multiple motor drive system with differential speed regulated by the continuously variable transmission CVT100 and the continuously variable transmission CVT200, and another end of which is installed with an engine power system constituted by an engine ICE100 and a transmission T301 with the functions of clutch, speed change, and differential speed, for driving wheel group W301 and wheel group W401;

motors M100, M200: constituted by AC or DC, brushless or brush, synchronous or non-synchronous, internal or external rotation type rotary motors;

generator G100: constituted by an AC or DC, brushless or brush, synchronous or non-synchronous, internal or external rotation type rotary generator; in which the generator G100 is installed between the engine ICE100 and the transmission T301, at the non-engine coupling side of the transmission T301, or at the unit driven by the transmission T301;

continuously variable transmissions CVT100, CVT200: in the form of continuously variable transmissions that can automatically change the speed ratio with the load state, or change the speed ratio by accepting external manipulation, and which may include any of a variety of CVT types, such as a rubber belt type, metal belt type, or chain type CVT, an electronic continuously variable transmission (ECVT), a friction disk type, or a conventional iso-axis continuously variable transmission; and electric control unit ECU400: constituted by an electric machine and/or solid state power element, an electronic element, a microprocessor, and/or related software, for accepting the control of user interface MI400 and/or central control unit CCU400, to control the power generation operation timing of the generator G100 and the voltage and current of the generating power, and in which one motor drive control circuit is installed within the electric control unit ECU400 to control the rotational speed, torque, rotary direction, and current of the parallel motors M100 and M200; or motor drive control circuits individually arranged for the motors M100 and M200 are installed within the electric control unit ECU400 to individually control the rotational speed, torque, rotary direction, and current of the parallel motors M100 and M200, wherein the motor drive control circuits do not involve closed loop or semi-closed loop rotational speed control between the two motors to achieve the differential speed function; the differential speed operation between the loads with differential speed instead being regulated by the continuously variable transmissions installed between the individual motors and loads, and wherein if the continuous variable transmissions accept external manipulation for changing speed ratio, electric control unit ECU400 includes drive control circuits for manipulation by interface MI100 and/or the continuously variable transmissions are controlled by central control unit CCU400;

electric energy management unit EMU100: constituted by an electric machine and/or solid state power element, an electronic element, a microprocessor, and/or related software, for controlling output voltage and current, charging voltage and current of the electric storage-discharge unit ESD100, and charging start and stop;

electric storage-discharge unit ESD100: constituted by at least on rechargeable secondary battery, capacitor, or super capacitor;

central control unit CCU400: in the form of an analog or digital control device, or a mixed analog and digital device, and constituted by an electric machine and/or solid state power element, a microprocessor including control software, and/or a related circuit element, for following the commands of the user interface MI400, for setting a control mode, and/or for following a feedback signal of the engine speed detecting device SD100, and further controlling the operation of the system;

user interface MI400: in the form of a linear analog or digital control device, or a mixed analog and digital control device, which is constituted by an operating mechanism, electric machine, and/or solid state circuit for linking with the central control unit CCU400 to control the operation of the multiple motor drive system with differential speed regulated by the continuous variable transmission CVT100 and the continuous variable transmission CVT200, and to control the operation of the engine power system, so as to drive the common load body L400;

transmissions T100, T200: in the form of fixed speed ratio, variable speed ratio, or stepless variable speed transmissions constituted by mechanical gear units, sprocket units, pulley units, or linkage groups; and selectable as needed; and transmission T301: constituted by a transmission component with the functions of clutch, speed change, and/or differential speed.

When the common load body L400 is driven for operation, and the wheel groups W100 and W200 installed at the load undergo differential speed operation, the continuous variable transmission CVT100 and the continuous variable transmission CVT200 individually carry out speed ratio regulation in accordance with the load variation of the wheel group W100 and the wheel group W200.

The system of this embodiment is installed with a fuel control unit FC100, tank TANK100, and/or engine speed detecting device SD100 for the control of the engine drive operation, including:

fuel control unit FC100: constituted by a power-driven servo unit and/or a mechanical and/or current force-type drive unit for accepting direct control from central control unit CCU400 and/or engine speed detecting device SD100 to control the fuel supply status rotational speed and torque force of the engine ICE100;

tank TANK100: used for engine fuel storage and, through the fuel pipeline and the fuel control unit FC100 between the tank TANK100 and the engine ICE100, for controlling the fuel to the engine ICE100; and engine speed detecting device SD100: constituted by an analog or digital rotational speed detecting device, which converts the amount of angular displacement to the corresponding physical signal, and/or substitutes an analog voltage value or frequency value of the generator G100, for transmitting an engine rotational speed signal to the central control unit CCU400 and/or directly controlling the fuel to the engine from the fuel control unit FC100, the engine speed detecting device SD100 alternatively being constituted by a mechanical detecting structure, such as a centrifugal type structure, that mechanically interacts with the fuel control unit FC100 to control the operation of the engine ICE100 depending on the system features.

The hybrid power system installed with the electric storage-discharge unit ESD100, as shown in FIG. 7, is capable of carrying out one or more of the following operational functions, including:

1. the engine power system driving the wheel group W301 and the wheel group W401, for driving common load body L400;

2. the engine power system driving the wheel group W301 and the wheel group W401, for driving the common load body L400 and, at the same time, driving the generator G100 for charging the electric storage-discharge unit ESD100;

3. the power of the electric storage-discharge unit ESD100 controlling the motor M100 and the motor M200 through the motor drive control circuit in the electric control unit ECU400, or regenerated power resulting from kinetic energy recovered from the motor M100 and/or the motor M200 being supplied back to the electric storage-discharge unit ESD100 for charging;

4. the power of the electric storage-discharge unit ESD100 directly, or through the motor drive control circuit in the electric control unit ECU400, controlling the motor M100 and the motor M200 for driving the wheel group W100 and the wheel group W200, and the engine power system driving the third wheel group W300 at an output side and the fourth wheel group W400 at an output side, for together driving the common load body L400;

5. the engine ICE100 operating within a range of rotational speed having lower fuel consumption and higher output power, i.e. in a more fuel-efficient operation region with best break specific fuel consumption, to drive the generator G100, the power generated by the generator G100 controlling, either directly or through the motor drive control circuit installed within the electric control unit ECU400, the operation of the motor M100 and the motor M200 driven, for driven the common load body L400;

6. the electric storage-discharge unit ESD100 accepting the power generated by the generator G100 driven by the engine ICE100 for charging, and/or the electric storage-discharge unit ESD100 being charged by an external power supply, and/or renewable generating power from the motor M100 and/or the motor M200 being supplied back to the electric storage-discharge unit ESD100 for charging; and 7. the power of the engine ICE100 individually driving the generator G100, for charging the electric storage-discharge unit ESD100 or powering outward.

Figure 8:
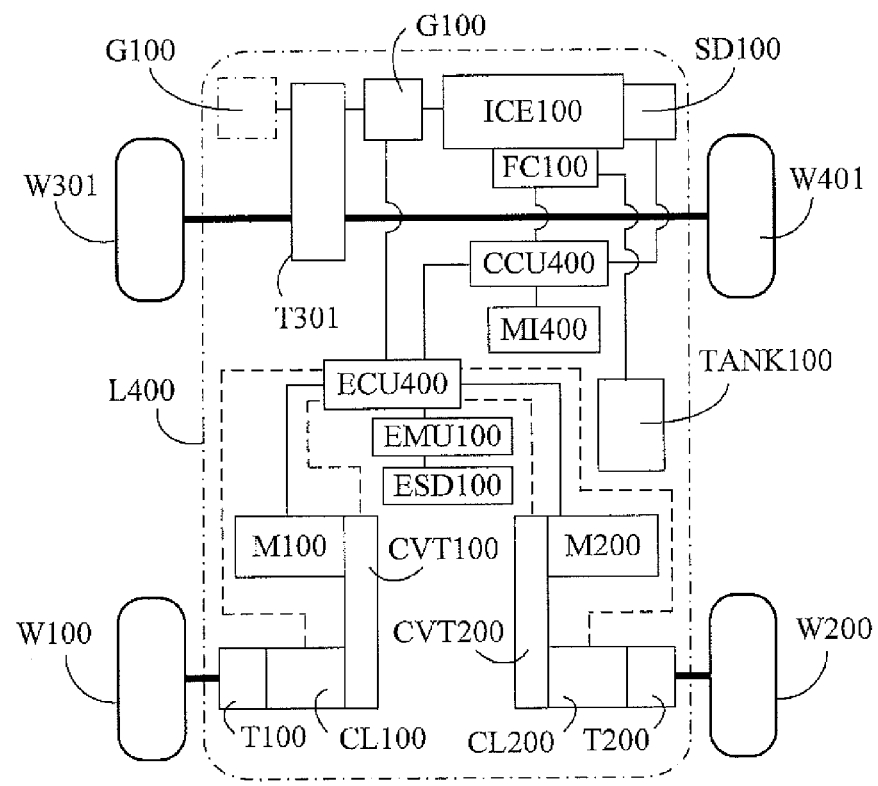
FIG. 8 is a schematic view showing an embodiment of the system of FIG. 7 additionally installed with a controllable clutch unit.

As shown in FIG. 7, the multiple motor drive system with differential speed regulated by continuous variable transmissions and the engine power drive unit are installed in the common load body L400, with individual loads being directly driven by the continuous variable transmissions, or driven by the continuous variable transmissions and additional transmissions, and in which a controllable clutch unit CL100 is additionally installed between the continuous variable transmission CVT100 and the transmission T100, and a controllable clutch unit CL200 is additionally installed between the continuous variable transmission CVT200 and the transmission T200, to individually provide linking transmission or cutting separation between the continuous variable transmission CVT100 and the transmission T100, and between the continuous variable transmission CVT200 and the transmission T200. FIG. 8 is a schematic view showing an embodiment of the system in FIG. 7 additionally installed with such controllable clutch units CL100, CL200. As shown in FIG. 8, each of the controllabel clutch units CL100, CL200 is in the form of a clutch device or structure with the function of linking transmission or cutting separation, and which is driven by manpower, electricity, magnetic power, machine power, gas pressure, liquid pressure, and/or centrifugal force, and which has a rotary input side and a rotary output side.

The invention claimed is:

1. A multiple motor drive system that provides a differential speed operation for driving a common load structure, comprising:
   a first individual motor (M100) and a second individual motor (M200) installed on the common load structure;
   a first continuously variable transmission (CVT100) installed on the common load structure and connected between the first individual motor (M100) and a first wheel group (W100), said first continuously variable transmission (CVT100) being arranged to automatically control a speed ratio according to a load state on the respective first wheel group (W100);
   a second continuously variable transmission (CVT200) installed on the common load structure and connected between the second individual motor (M200) and a second wheel group (W200), said second continuously variable transmission (CVT200) being arranged to automatically control a speed ratio according to a load state on the respective second wheel group (W200); and
   an electric control unit (ECU100) arranged to respectively control a rotation speed, torque, direction, and current of the first and second individual motors (M100, M200) without using a closed or semi-closed loop to achieve the differential speed operation, the differential speed operation instead being achieved through the respective speed ratio control provided by the first continuously variable transmission (CVT100) and the second continuously variable transmission (CVT200).

2. A multiple motor drive system that provides a differential speed operation for driving a common load structure as claimed in claim 1, wherein the electric control unit (ECU100) includes one of a common drive circuit and respective individual drive circuits for controlling the rotational speed, torque, direction, and current of the first and second individual motors (M100, M200), and wherein the electric control unit (ECU100) is further connected to receive commands from at least one of a user interface (MI100) and a central control unit (CCU100).

3. A multiple motor drive system that provides a differential speed operation for driving a common load structure as claimed in claim 1, wherein said first and second continuously variable transmissions (CVT100, CVT200) accept external manipulation of said speed ratios by the electric control unit (ECU100) through at least one of a user interface (MI100) and a central control unit (CCU100).

4. A multiple motor drive system that provides a differential speed operation for driving a common load structure as claimed in claim 1, further comprising a first transmission (T100) connected between the first continuously variable transmission (CVT100) and the first wheel group (W100), and a second transmission (T200) connected between the second continuously variable transmission (CVT200) and the second wheel group (W200), said first and second transmissions (T100, T200) including at least one of: (a) a mechanical gear unit, (b) sprocket unit, (c) pulley unit, and (d) linkage group to form a fixed speed ratio transmission, variable speed ratio, or stepless speed variable transmission.

5. A multiple motor drive system that provides a differential speed operation for driving a common load structure as claimed in claim 4, further comprising first and second clutch units (CL100, CL200) respectively installed between the first and second transmissions (T100, T200) and the first and second continuously variable transmissions (CVT100, CVT200), said first and second clutch units selectively linking and cutting off the first and second transmissions (T100, T200) to the first and second continuously variable transmissions (CVT100, CVT200).

6. A multiple motor drive system that provides a differential speed operation for driving a common load structure as claimed in claim 5, wherein said first and second clutch units (CL100, CL200) are arranged to be driven by at least one of manpower, electricity, magnetic power, machine power, gas pressure, liquid pressure, and centrifugal force.

7. A multiple motor drive system that provides a differential speed operation for driving a common load structure as claimed in claim 1, wherein said first and second individual motors (M100, M200) are selected from the group consisting of AC or DC, brushed or brushless, synchronous or non-synchronous, and internal or external rotation-type electric motors.

8. A multiple motor drive system that provides a differential speed operation for driving a common load structure as claimed in claim 1, wherein the first and second continuously variable transmissions (CVT100, CVT200) each include one of: (a) a continuously variable transmission having a rubber belt, metal belt, or chain, (b) an electronic continuously variable transmission (ECVT), and (c) a friction disc continuously variable transmission.

9. A multiple motor drive system that provides a differential speed operation for driving a common load structure as claimed in claim 1, further comprising an electric storage-discharge unit (ESD100) for supplying electrical power to said electric control unit (ECU100) and said first and second individual motors (M100, M200), and an electronic energy management unit (EMU100) for controlling an output voltage and current, and a charging voltage and current, for said electric storage-discharge unit (ESD100).

10. A multiple motor drive system that provides a differential speed operation for driving a common load structure as claimed in claim 1, further comprising a third continuously variable transmission (CVT300) connected between a third individual motor (M300) and a third wheel group (W300), and a fourth continuously variable transmission (CVT400) connected between a fourth individual motor (M400) and a fourth wheel group (W400), wherein the electric control unit (ECU100) is arranged to respectively control a rotation speed, torque, direction, and current of the first, second, third, and fourth individual motors (M100, M200) without using a closed or semi-closed loop to achieve the differential speed operations, the differential speed operations instead being achieved through the respective speed ratio control provided by the first continuously variable transmission (CVT100), the second continuously variable transmission (CVT200), the third continuously variable transmission (CVT300), and the fourth continuously variable transmission (CVT400).

11. A multiple motor drive system that provides a differential speed operation for driving a common load structure as claimed in claim 10, further comprising a first transmission (T100) connected between the first continuously variable transmission (CVT100) and the first wheel group (W100), a second transmission (T200) connected between the second continuously variable transmission (CVT200) and the second wheel group (W200), a third transmission (T300) connected between the third continuously variable transmission (CVT300) and the third wheel group (W300), and a fourth transmission (T400) connected between the fourth continuously variable transmission (CVT400) and the fourth wheel group (W400).

12. A multiple motor drive system that provides a differential speed operation for driving a common load structure as claimed in claim 11, further comprising a first controllable clutch unit (CL100) connected between the first transmission (T100) and the first continuously variable transmission (CVT100), a second controllable clutch unit (CL200) connected between the second transmission (T200) and the second continuously variable transmission (CVT200), a third controllable clutch unit (CL300) connected between the third transmission (T300) and the third continuously variable transmission (CVT300), and a fourth controllable clutch unit (CL400) connected between the fourth transmission (T400) and the fourth continuously variable transmission device (CVT400).

13. A multiple motor drive system that provides a differential speed operation for driving a common load structure as claimed in claim 12, wherein said first, second, third, and fourth controllable clutch units (CL100, CL200, CL300, CL400) are arranged to be driven by at least one of manpower, electricity, magnetic power, machine power, gas pressure, liquid pressure, and centrifugal force.

14. A multiple motor drive system that provides a differential speed operation for driving a common load structure as claimed in claim 10, wherein said first, second, third, and fourth individual motors (M100, M200, M300, M400) are selected from the group consisting of AC or DC, brushed or brushless, synchronous or non-synchronous, and internal or external rotation-type electric motors.

15. A multiple motor drive system that provides a differential speed operation for driving a common load structure as claimed in claim 10, wherein the first, second, third, and fourth continuously variable transmissions (CVT100, CVT200, CVT300, CVT400) each include one of: (a) a continuously variable transmission having a rubber belt, metal belt, or chain, (b) an electronic continuously variable transmission (ECVT), and (c) a friction disc continuously variable transmission.

16. A multiple motor drive system that provides a differential speed operation for driving a common load structure as claimed in claim 10, further comprising an electric storage-discharge unit (ESD100) for supplying electrical power to said electric control unit (ECU100) and said first, second, third, and fourth individual motors (M100, M200, M300, M400), and an electronic energy management unit (EMU100) for controlling an output voltage and current, and a charging voltage and current, for said electric storage-discharge unit (ESD100).

17. A multiple motor drive system that provides a differential speed operation for driving a common load structure as claimed in claim 10, wherein the electric control unit (ECU100) includes one of a common drive circuit and respective individual drive circuits for controlling the rotational speed, torque, direction, and current of the first, second, third, and fourth individual motors (M100, M200, M300, M400), and wherein the electric control unit (ECU100) is further connected to receive commands from at least one of a user interface (MI200) and a central control unit (CCU200).

18. A multiple motor drive system that provides a differential speed operation for driving a common load structure as claimed in claim 1, further comprising:

a third wheel group (W301) and a fourth wheel group (W401) driven by an engine (ICE100) through a transmission (T301);

a generator (G100) driven by the engine (ICE100) and connected to the electric control unit (ECU300) for supplying electrical power to the first and second individual motors (M100, M200) under control of the electric control unit (ECU300), the central control unit (CCU300), and the user interface (MI300); and a fuel control unit (FC100) connected to the central control unit (CCU300) for controlling supply of fuel from a fuel supply (TANK100) to the engine (ICE100), said fuel control unit being controlled directly by the central control unit (CCU300) or in response to signals from an engine speed detector (SD100).

19. A multiple motor drive system that provides a differential speed operation for driving a common load structure as claimed in claim 18, wherein the common load structure is a common load body (L300) and said multiple motor drive system constitutes a hybrid power system having the following operational functions:
 (a) the engine (ICE100) drives the third and fourth wheel groups (W301) and (W401) to drive the common load body (L300);
 (b) the engine (ICE100) drives the generator (G100) to control driving operation of the first and second individual motors (M100, M200), either directly or through a motor drive control circuit in the electric control unit (ECU300), to drive the common load body (L300) by driving the first and second wheel groups (W100, W200); and
 (c) the common load body (L300) is driven by a combination of operational functions (a) and (b).

20. A multiple motor drive system that provides a differential speed operation for driving a common load structure as claimed in claim 19, further comprising a first transmission (T100) connected between the first continuously variable transmission (CVT100) and the first wheel group (W100), and a second transmission (T200) connected between the second continuously variable transmission (CVT200) and the second wheel group (W200), said first and second transmissions (T100, T200) including at least one of: (a) a mechanical gear unit, (b) sprocket unit, (c) pulley unit, and (d) linkage group to form a fixed speed ratio transmission, variable speed ratio, or stepless speed variable transmission.

21. A multiple motor drive system that provides a differential speed operation for driving a common load structure as claimed in claim 20, further comprising first and second clutch units (CL100, CL200) respectively installed between the first and second transmissions (T100, T200) and the first and second continuously variable transmissions (CVT100, CVT200), said first and second clutch units selectively linking and cutting off the first and second transmissions (T100, T200) to the first and second continuously variable transmissions (CVT100, CVT200) upon being driven by at least one of manpower, electricity, magnetic power, machine power, gas pressure, liquid pressure, and centrifugal force.

22. A multiple motor drive system that provides a differential speed operation for driving a common load structure as claimed in claim 19, further comprising an electric storage-discharge unit (ESD100) for supplying electrical power to said electric control unit (ECU100) and said first and second individual motors (M100, M200), and an electronic energy management unit (EMU100) for controlling an output voltage and current, and a charging voltage and current, for said electric storage-discharge unit (ESD100).

23. A multiple motor drive system that provides a differential speed operation for driving a common load structure as claimed in claim 22, wherein said multiple motor drive system constitutes a hybrid power system having the following operational functions:
- (a) the engine (ICE100) drives the third and fourth wheel groups (W301) and W401) to drive the common load body (L300);
- (b) the engine (ICE100) drives the third and fourth wheel groups (W301) and (W401) and also drives the generator (G100) to charge the electric storage-discharge unit (ESD100);
- (c) the electric storage-discharge unit (ESD100) supplies power to the first and second individual motors (M100, M200) directly or through the electric control unit (ECU400) to drive the first and second wheel groups (W100, W200), and kinetic energy is reclaimed and regenerated by the first and second individual motors (M100, M200) for charging the electric storage-discharge unit (ESD100);
- (d) the engine (ICE100) drives the third and fourth wheel groups (W301, W401) and the electric storage-discharge unit (ESD100) supplies power to the first and second individual motors (M100, M200) to drive the first and second wheel groups (W100, W200), said engine (ICE100) and first and second individual motors (M100, M200) thereby jointly driving a common load body (L400);
- (e) the engine (ICE100) drives the generator (G100) to supply power to the first and second individual motors (M100, M200) to drive the common load body (L400) through the first and second wheel groups (W100, W200);
- (f) the engine (ICE100) drives the generator (G100) to charge the electric storage-discharge unit (ESD100) and kinetic energy is reclaimed and regenerated by the first and second individual motors (M100, M200) to also charge the electric storage-discharge unit (ESD100); and
- (g) the engine (ICE100) drives the generator (G100) to charge the electric storage-discharge unit (ESD100) and drive the third and fourth wheel groups (W300, W400).

24. A multiple motor drive system that provides a differential speed operation for driving a common load structure as claimed in claim 23, wherein the engine (ICE100) operates within a rotational speed range of greater fuel-efficient operation having lower fuel consumption and higher output power to achieve a best break specific fuel consumption, so as to drive the generator (G100) to generate power directly or, through the motor drive control circuit installed within the electric control unit (ECU300), to control the first individual motor (M100) and the second individual motor (M200) to perform driving operation, and thereby drive a common load body (L300).

* * * * *